United States Patent [19]
Bauer et al.

[11] Patent Number: 5,108,465
[45] Date of Patent: Apr. 28, 1992

[54] PROCESS AND DEVICE FOR OBTAINING PURE OXYGEN

[75] Inventors: Gerd Bauer, Darmstadt; Helmuth Krauss, Bensheim-Auerba; Matthias Kuntz, Mühltal-Traisa, all of Fed. Rep. of Germany

[73] Assignee: Merck Patent Gesellschaft Mit Beschränkter Haftung, Darmstadt, Fed. Rep. of Germany

[21] Appl. No.: 544,441

[22] Filed: Jun. 27, 1990

[30] Foreign Application Priority Data

Jun. 29, 1989 [DE] Fed. Rep. of Germany ....... 3921390

[51] Int. Cl.⁵ .................. B01D 53/22; B01D 71/02
[52] U.S. Cl. ................................. 55/16; 55/68; 55/158
[58] Field of Search ................... 55/16, 68, 158

[56] References Cited

U.S. PATENT DOCUMENTS

| | | | |
|---|---|---|---|
| 1,174,631 | 3/1916 | Snelling | 55/16 X |
| 3,350,846 | 11/1967 | Makrides et al. | 55/16 |
| 3,359,705 | 12/1967 | Mullhaupt | 55/16 |
| 3,413,777 | 12/1968 | Langley et al. | 55/158 |
| 3,509,694 | 5/1970 | Imai et al. | 55/158 X |
| 3,630,690 | 12/1971 | Coppola | 55/16 X |
| 3,901,669 | 8/1975 | Seitzer | 55/16 |
| 3,941,673 | 3/1976 | Takao et al. | 55/16 X |
| 4,151,060 | 4/1979 | Isenberg | 55/16 X |
| 4,427,424 | 1/1984 | Charpin et al. | 55/158 |

FOREIGN PATENT DOCUMENTS

| | | | |
|---|---|---|---|
| 57-207533 | 12/1982 | Japan | 55/16 |
| 58-064258 | 4/1983 | Japan | 55/158 |
| 59-055314 | 3/1984 | Japan | 55/158 |
| 59-055315 | 3/1984 | Japan | 55/158 |
| 59-150508 | 8/1984 | Japan | 55/158 |
| 61-002548 | 1/1986 | Japan | 55/158 |
| 63-291621 | 11/1988 | Japan | 55/158 |
| 1372883 | 11/1974 | United Kingdom | 55/16 |

Primary Examiner—Robert Spitzer
Attorney, Agent, or Firm—Millen, White & Zelano

[57] ABSTRACT

The invention relates to a process and a device for obtaining pure oxygen using a gastight membrane which can conduct both electrons and oxygen ions.

24 Claims, 2 Drawing Sheets

PROCESS AND DEVICE FOR OBTAINING PURE OXYGEN

SUMMARY OF THE INVENTION

The applicant relates to a process and a device for obtaining pure oxygen from gas mixtures containing oxygen.

Oxygen is required in large amounts in many sectors of technology, particularly for oxidization and combustion processes. The customary large-scale process is based on the fractional condensation of air in the so-called Linde process. Both chemical and electrochemical processes are also known.

A known electrochemical oxygen pump (see, for example R. Röttenbacher, W. Schäfer, Fügen von von keramischen Bauteilen, Fortschrittsberichte der DKG, Band 1 (1985) Heft 2, 126-137) is composed of a membrane which is capable of conducting oxygen ions and is lined on both sides with porous electrodes. When a potential is applied, oxygen is reduced at the cathode to oxygen ions, which migrate through the membrane to the anode and are there re-oxidized to oxygen. It is possible in this manner to pump pure oxygen into the anode compartment from the cathode compartment, which is swept with an oxygen-containing gas.

Because of electrode polarization and other losses of energy, the efficiency of such cells is only about 60%. When losses in the generation and transport of current are taken into account, a total efficiency of only about 20% results.

An object of the invention therefore is to provide a process for obtaining pure oxygen, which on the one hand does not require the input of resources of the Linde process, which can only be implemented in large-scale plants, and which, on the other hand, proceeds with a good efficiency in simple plants of virtually any desired dimensions.

Upon further study of the specification and appended claims, further objects and advantages of this invention will become apparent to those skilled in the art.

It has now been found that these objects can be achieved by the use of membranes which are capable of conducting both electrons and oxygen ions.

The invention therefore relates to a device for obtaining pure oxygen from gas mixtures containing oxygen, comprising a first gas compartment having an inlet and an outlet for the gas mixture containing oxygen, a second gas compartment having an outlet for pure oxygen, a membrane which separates the two gas compartments and is capable of conducting both oxygen ions and electrons, and means of producing an oxygen partial pressure difference between the two gas compartments.

The invention also relates to a process for obtaining pure oxygen from gas mixtures containing oxygen, which is characterized in that the oxygen-containing gas mixture is brought into a first gas compartment which is separated from a second gas compartment by a membrane which is impermeable to gas but conducts electrons and oxygen ions, a positive pressure difference between the first and the second gas compartment is arranged by producing an excess pressure in the first gas compartment and/or by producing a reduced pressure in the second gas compartment, and pure oxygen is withdrawn from the second gas compartment.

Finally, the invention also relates to the use of membranes capable of conducting electrons and oxygen ions in processes for obtaining pure oxygen.

Generally, the oxygen-containing gas is a gas containing at least about 5 vol. % $O_2$, preferably between about 10 vol. % to 50 vol. % $O_2$ and especially about 20 vol. % $O_2$.

Similarly, the pure oxygen or high purity oxygen is a gas generally containing at least about 90 vol. % $O_2$, preferably more than about 95 vol. % $O_2$ and especially more than 99 vol. % $O_2$.

The principle on which the present invention is based consists in producing different oxygen partial pressures in two gas compartments separated by a membrane which is impermeable to gas but conducts both electrons and oxygen ions, as a result of which a large chemical potential difference is produced. This chemical potential difference can only be equalized if oxygen is transported from the gas compartment having the higher partial pressure into the gas compartment having the lower partial pressure, since the membrane is impervious to gas, this can only take place by the transport of oxygen ions.

For this to happen, the oxygen on the oxygen-rich side must absorb electrons from the membrane and be transformed into the ionic form and correspondingly be transformed into the neutral form on the oxygen-deficient side by the release of electrons. Thus, a migration of oxygen ions from the oxygen-rich side to the oxygen-deficient side of the membrane, and a migration of electrons in the opposite direction takes place in the hybrid conductor.

The sole motive force for this oxygen pump is the oxygen partial pressure difference between the two sides of the membrane. In terms of an optimum procedure, care will therefore be taken to ensure that this differential pressure is as great as possible. This can be effected by compressing the gas mixture containing oxygen and/or by reducing the pressure in the gas compartment containing the pure oxygen. For example, a pressure of 5-15 bar can be produced by means of simple compressors, which corresponds, when air is used as the oxygen-containing gas mixture, to an oxygen partial pressure of about 1-3 bar. An adequate potential difference can be produced by reducing the pressure on the product side to about 5-20 mbar. Preferably, the oxygen partial pressure in the first compartment is at least two to three times the pressure in the second gas compartment.

Suitable materials for a membrane according to the invention are, in particular, ceramic materials having the required hybrid conductor properties. Materials of this type are known and can be found, in particular, among mixed oxide ceramic materials, such as, for example, $BaFe_{0.5}Co_{0.5}YO_3$, yellow lead oxide, $ThO_2$ or $Sm_2O_3$-doped $ThO_2$, $MoO_3$-doped or $Er_2O_3$-doped $Bi_2O_3$, $Gd_2Zr_2O_7$, $CaTi_{1-x}M_xO_{3-\alpha}$ (M=Fe, Co, Ni, X=0-0.5, $\alpha$=0-0.5) $SrCeO_3$ and $Y_3a_2Cu_3O_{7-\beta}$ ($\beta$=0-1). As a rule, these materials are prepared by mixing the oxide constituents and subsequent sintering or by reactive sintering processes. A material of the composition $(VO)_2P_2O_7$, which can be prepared by co-precipitation, if appropriate, after prior reduction, and subsequent sintering, and which has particularly high conductivity values is also a particularly suitable material.

As a rule, the conductivity of these membranes for oxygen ions depends on the temperature and optimum values are often only obtained at fairly high temperatures, which can well be within the range of about 400°-1100° C. In order to obtain as rapid a throughput of oxygen as possible, the process should be carried out not only at high temperatures, but also using membranes which are as thin as possible, but nevertheless impervious to gas and mechanically stable.

As a rule, ceramic materials of this type are impervious to gas if they have a high density, markedly above 90% of the theoretical density, and have neither cracks nor a continuous porosity. In this case, impermeability to gas exists at thicknesses as low as about 10-100 nm.

In order to render membranes of this thickness also mechanically sufficiently stable, the ceramic material is preferably applied to a porous support. If the membrane is adequately stable, however, it is also possible to carry out the process without the assistance of a support.

BRIEF DESCRIPTION OF THE DRAWINGS

Various other objects, features and attendant advantages of the present invention will be more fully appreciated as the same becomes better understood when considered in conjunction with the accompanying drawing, in which like reference characters designate the same or similar parts throughout the several views, and wherein.

DETAILED DESCRIPTION OF THE DRAWINGS

Figure 1:
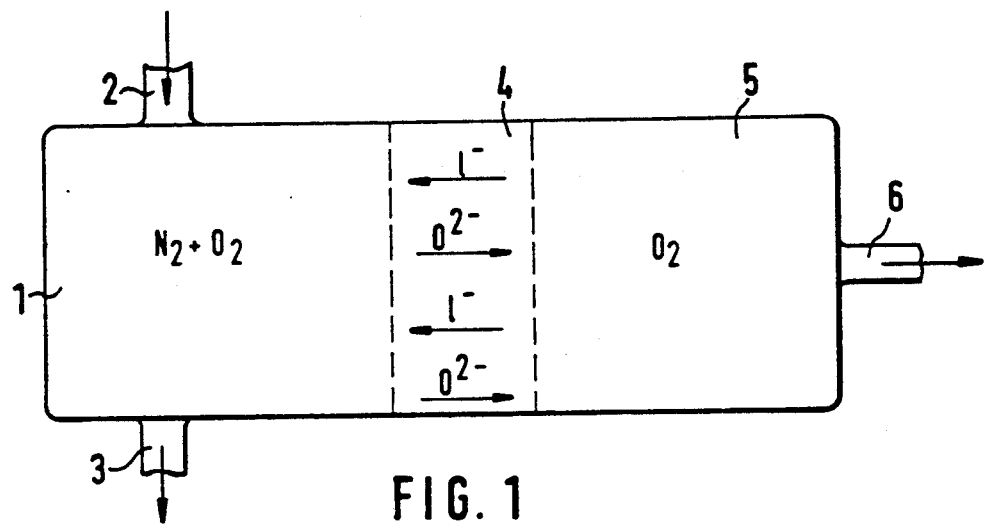
FIG. 1 is a diagram of a device according to the invention.

The mode of operation of the device according to the invention is indicated merely diagrammatically in FIG. 1. In this Figure, (1) marks the first gas compartment containing the oxygen-containing gas mixture, for example air; this compartment has a gas inlet (2) and a gas outlet (3). The first gas compartment (1) is separated by the membrane (4) from the second gas compartment (5), which has the oxygen outlet (6).

Figure 2:
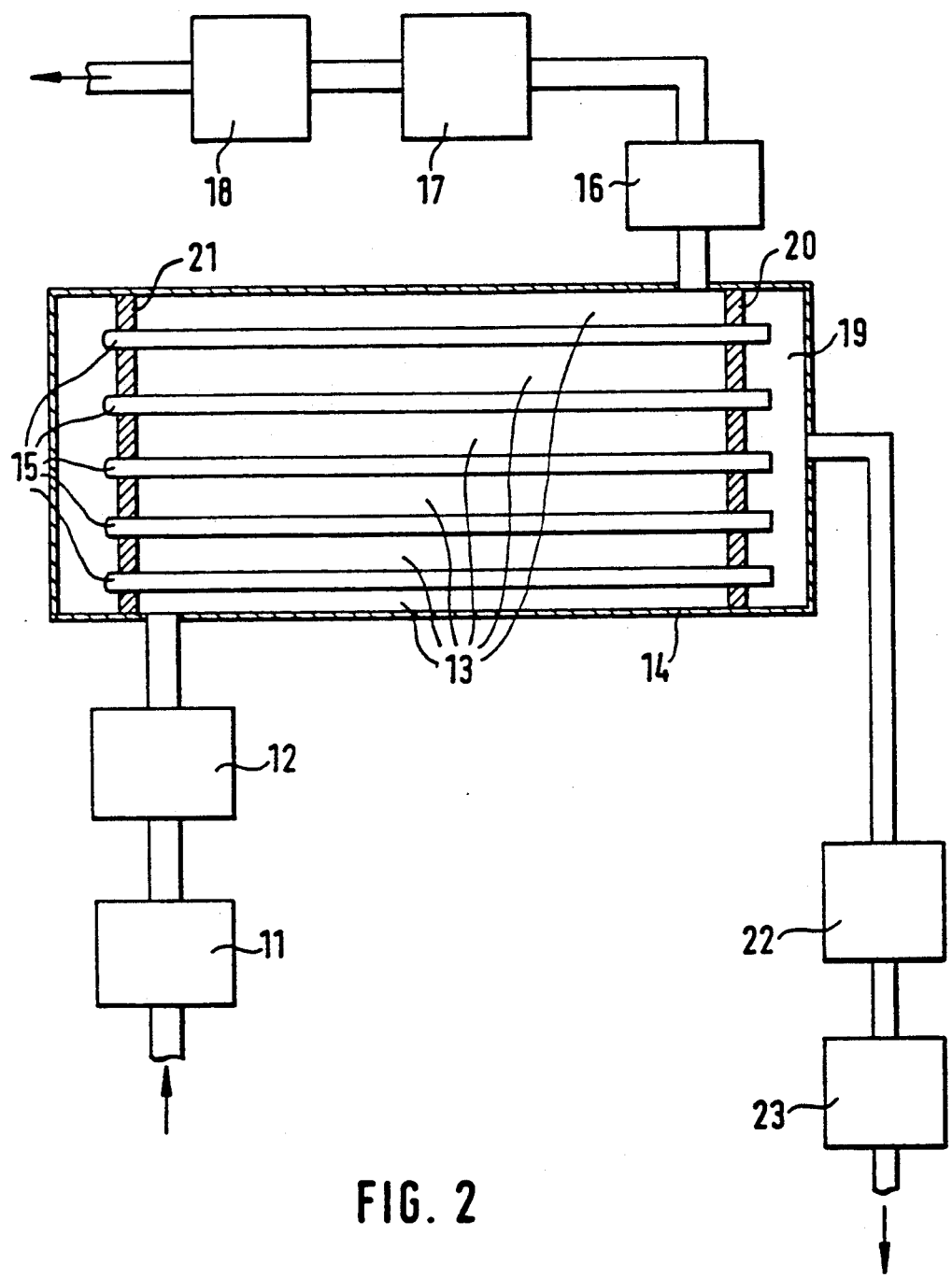
FIG. 2 is a device according to the invention in the form of a tubular heat exchanger.

In practice an installation for obtaining oxygen will preferably be constructed in such a way that the membrane surface available is as large as possible. For this purpose the installation can, for example, be constructed analogously to a tubular or plate heat exchanger. An example of a preferred embodiment of this type is shown in FIG. 2. An oxygen-containing gas, for example air, is injected via a compressor (11) and a heat exchanger (12), for heating it, into the first gas compartment (13), which is formed by the casing (14), flows round the membrane tubes (15) there and is reconveyed into the open via a throttle (16), a flow measurement cell (17) and a heat exchanger (18), for cooling the gas mixture. The second gas compartment (19) is separated from the first gas compartment (13) on the one hand by the membrane tubes (15) and on the other hand by the tubeplate (20), which is welded in a gastight manner to the casing (14) and the membrane tubes. The second tubeplate (21) serves merely to stabilize the membrane tubes (15) and does not need to be attached in a gastight manner to the latter. It can even be advantageous if the tubes are only mounted loosely in the tubeplate (21), in order to give unhindered heat expansion. The oxygen which has been transported into the gas compartment (10) is fed to the consumer via the heat exchanger (22) and the vacuum pump (23).

As already explained, it is possible to produce the membrane in a self-supporting form. This is effected, as a rule, by starting from a sintered and ground ceramic powder which is then compressed into the appropriate shape in a manner known per se and is sintered once more.

Thus, for example, continuous casting processes and injection molding processes are known which make it possible to produce ceramic films or ceramic moldings. In the continuous casting process, a non-aqueous slurry is mixed from ceramic powder, solvent, binder and plasticizer and is cast on a circulating band and brought to a uniform thickness by means of a calibrated cutter. The film formed by evaporation of the solvent, which film has a thickness of about 25–1000 μm, can then be processed further in a customary manner.

In the injection molding process, the ceramic powder is mixed with a thermoplastic powder, brought into a viscous, liquid condition at an elevated temperature and injected into the desired mold under high pressure.

In most cases, however, the membrane will be applied in the form of a thin film to a porous support. Processes for effecting this are also known, such as, for example, plasma spray coating.

In this case, the ceramic material is vaporized in a plasma field, if appropriate with the assistance of microwaves, and can be deposited on any desired substrate. The stability of the ceramic layer in this case depends primarily on the substrate used.

In principle, however, a ceramic coating can also be obtained by casting a ceramic slurry and subsequently drying and stoving it.

Finally, the ceramic layer can also be applied by the sol-gel process. In this process the porous substrate is impregnated with an appropriate organometallic solution. Gel-formation is effected by heating, and the formation of the oxide ceramic film takes place after the organic constituents have been decomposed.

Figure 3:
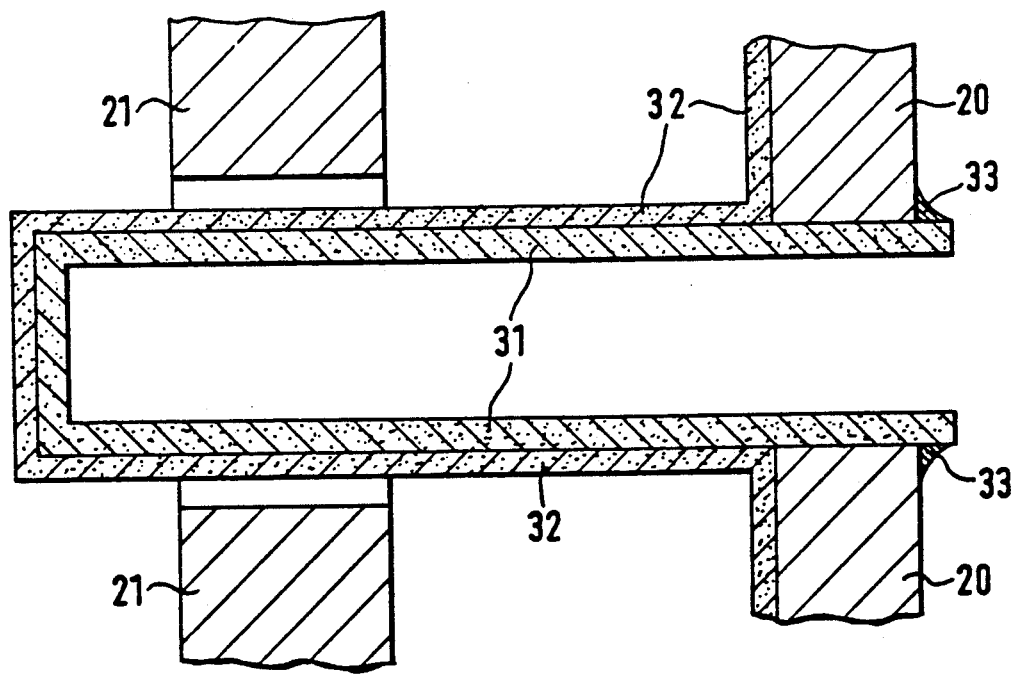
FIG. 3 is a detailed view of a supported membrane used in the embodiment of FIG. 2.

In all supported membranes care must be taken that the support material has a continuous porosity which has as uniform a distribution as possible and has a pore size not greater than about 1 μm. Examples of suitable support materials are sintered metals, porous ceramics composed of $Al_2O_3$ or $ZrO_2$, silica bricks resistant to high temperature (Chamotte) and porous glass. A detailed example of the device according to FIG. 2 having a supported membrane of this type is shown in FIG. 3. In this Figure, the membrane tube (15) shown in FIG. 2 consists of a porous inner tube (31) composed of, for example, sintered metal or a porous $Al_2O_3$ support tube, and the sprayed-on membrane (32). The tubeplate (20) is attached to the inner tube (31) in a gastight manner by means of the welded seam (33), whereas the tubeplate (21) supports the membrane tube only in a loose manner.

Devices according to the present invention can be constructed in any desired dimensions and hence can be adjusted to suit the particular requirements of the consumer. A valuable new process for obtaining pure oxygen is thus provided.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosures of all applications, patents and publications, cited above and below, and of corresponding application Federal Republic of Germany P 39 21 390.0, filed Jun. 29, 1989, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for obtaining high purity oxygen from gas mixtures containing oxygen, comprising:
    delivering an oxygen-containing gas mixture into a first gas compartment which is separated from a second gas compartment by a membrane, said membrane being impermeable to gas yet capable of conducting electrons and oxygen ions and comprising a ceramic material selected from the group consisting of $BaFe_{0.5}Co_{0.5}YO_3$; yellow lead oxide; $ThO_2$; $Sm_2O_3$-doped $ThO_2$; $MoO_3$-doped $Bi_2O_3$; $Er_2O_3$-doped $Bi_2O_3$; $Gd_2Zr_2O_7$; $CaTi_{1-x}M_xO_{3-\alpha}$ wherein M is Fe, Co or Ni, X is 0–0.5 and $\alpha$ is 0–0.5; $SrCeO_3$; $YBa_2Cu_3O_{7-\beta}$ wherein $\beta$ is 0–1 and $(VO)_2P_2O_7$;
    establishing a positive oxygen partial pressure difference between said first and second gas compartments by producing an excess pressure in said first gas compartment and/or by producing a reduced pressure in said second gas compartment; and
    withdrawing pure oxygen from said second gas compartment.

2. A process according to claim 1, wherein the oxygen partial pressure in said first gas compartment is at least about two to three times the pressure in said second gas compartment.

3. A process according to claim 1, wherein said oxygen-containing gas mixture is air having an oxygen partial pressure of about 1–3 bar.

4. A process according to claim 3, wherein the pressure in said second gas compartment is about 5–20 mbar.

5. A process according to claim 1, wherein the pressure in said second gas compartment is about 5–20 mbar.

6. A process for obtaining high purity oxygen from gas mixtures containing oxygen, comprising:
    delivering an oxygen-containing gas mixture into a first gas compartment which is separated from a second gas compartment by a membrane, said membrane being impermeable to gas yet capable of conducting electron and oxygen ions, wherein said membrane comprises a ceramic material selected from a group of materials comprising $BaFe_{0.5}Ce_{0.5}YO_\beta$; yellow lead oxide; $ThO_2$; $Sm_2O_3$-doped $ThO_2$; $MoO_3$-doped $Bi_2O_3$; $Er_2O_3$-doped $Bi_2O_3$; $Gd_2Zr_2O_7$; $CaTi_{1-x}M_xO_{3-\alpha}$ wherein M is Fe, Co, or Ni; $SrCeO_3$; $YBa_2Cu_3O_{7-x}$, or $(VO)_2P_2O_7$;
    establishing a positive oxygen partial pressure difference between said first and second gas compartments by producing an excess pressure in said first gas compartment and/or by producing a reduced pressure in said second gas compartment; and
    withdrawing pure oxygen from said second gas compartment.

7. A device for obtaining high purity oxygen from mixtures of gases containing oxygen, comprising:
    a first gas compartment having an inlet and an outlet for a gas mixture containing oxygen;
    a second gas compartment having an outlet for pure oxygen;
    a membrane separating said first and second gas compartments wherein said membrane is capable of conducting both oxygen ions and electrons and comprises a ceramic material selected from the group comprising $BaFe_{0.5}Co_{0.5}YO_3$; yellow lead oxide; $ThO_2$; $Sm_2O_3$-doped $ThO_2$; $MoO_3$-doped $Bi_2O_3$; $Er_2O_3$-doped $Bi_2O_3$; $Gd_2Zr_2O_7$; $CaTi_{1-x}M_xO_{3-\alpha}$, wherein M is Fe, Co or Ni, X is 0–0.5, and $\alpha$ is 0–0.5; $SrCeO_3$; $YBa_2Cu_3O_{7-\beta}$, wherein $\beta$ is 0–1; or $(VO)_2P_2O_7$; and
    means for producing an oxygen partial pressure difference between said first and second gas compartments.

8. A device according to claim 7, wherein said ceramic material is $YBa_2CuO_{7-\beta}$ wherein $\beta$ is 0–1, $SrCeO_3$ or $(VO)_2P_2O_7$.

9. A device according to claim 7, wherein said device is constructed in the form of a plate heat exchanger or a tubular heat exchanger.

10. A device according to claim 9, wherein said means for producing an oxygen partial pressure difference further comprises a pressure reduction means for reducing the pressure in said second gas compartment.

11. A device according to claim 7, wherein said membrane is impermeable to gas.

12. A device according to claim 7, wherein said means for producing an oxygen partial pressure difference comprises a compressor means for compressing a gas mixture containing oxygen to be delivered to said first compartment.

13. A device according to claim 7, wherein said means for producing an oxygen partial pressure difference comprises a pressure reduction means for reducing the pressure in said second gas compartment.

14. A device for obtaining high purity oxygen from mixtures of gases containing oxygen, comprising:
    a first gas compartment having an inlet and an outlet for a gas mixture containing oxygen;
    a second gas compartment having an outlet for pure oxygen;
    a membrane separating said first and second gas compartments wherein said membrane is capable of conducting both oxygen ions and electrons, has a thickness of 10–100 nm and is applied to a porous support, wherein said membrane is a ceramic material selected from the group consisting of $BaFe_{0.5}Co_{0.5}YO_3$; yellow lead oxide; $ThO_2$; $Sm_2O_3$-doped $ThO_2$; $MoO_3$-doped $Bi_2O_3$; $Er_2O_3$-doped $Bi_2O_3$; $Gd_2Zr_2O_7$; $CaTi_{1-x}M_xO_{3-\alpha}$, wherein M is Fe, Co or Ni, X is 0–0.5, and $\alpha$ is 0–0.5; $SrCeO_3$; $YBa_2Cu_3O_{7-\beta}$ wherein $\beta$ is 0–1; and $(VO)_2P_2O_7$; and
    means for producing an oxygen partical pressure difference between said first and second gas compartments.

15. A device according to claim 14, wherein the support material has a continuous porosity, a substantially uniform distrubution, and a pore size not greater than about 1 $\mu$m.

16. A device according to claim 14, wherein said support is sintered metal, porous ceramic composed of $Al_2O_3$ or $ZrO_2$, silica brick resistant to high temperature, or porous glass.

17. A device according to claim 14, wherein said membrane is impermeable to gas.

18. A device according to claim 14, wherein said ceramic material is $YBa_2CuO_{7-\beta}$ wherein $\beta$ is 0-1, $SrCeO_3$ or $(VO)_2P_2O_7$.

19. A device for obtaining high purity oxygen from mixtures of gases containing oxygen, comprising:
- a first gas compartment having an inlet and an outlet for a gas mixture containing oxygen;
- a second gas compartment having an outlet for pure oxygen;
- a membrane separating said first and second gas compartments wherein said membrane is capable of conducting both oxygen ions and electrons, wherein said ceramic material is $BaFe_{0.5}Co_{0.5}YO_3$; yellow lead oxide; $ThO_2$; $Sm_2O_3$-doped $ThO_2$; $MoO_3$-doped $Bi_2O_3$; $Er_2O_3$-doped $Bi_2O_3$; $Gd_2Zr_2O_7$; $CaTi_{1-x}M_xO_{3-\beta}$, wherein M is Fe, Co or Ni, X is 0-0.5, and $\alpha$ is 0-0.5; $SrCeO_3$; $YBa_2Cu_3O_{7-\beta}$, wherein $\beta$ is 0-1; and $(VO)_2P_2O_7$; and
- means for producing an oxygen partial pressure difference between said first and second gas compartments, wherein said device is constructed in the form of a plate heat exchanger or a tubular exchanger.

20. A device according to claim 19, wherein said membrane has a thickness of 10-100 nm and is applied to a porous support.

21. A device according to claim 20, wherein the support material has a continuous porosity, a substantially uniform distrubution, and a pore not greater than about 1 μm.

22. A device according to claim 20, wherein said support is sintered metal, porous ceramic composed of $Al_2O_3$ or $ZrO_2$, silica brick resistant to high temperature, or porous glass.

23. A device according to claim 19, wherein said membrane is impermeable to gas.

24. A device according to claim 19, wherein said ceramic material is $YBa_2CuO_{7-\beta}$ wherein $\beta$ is 0-1, $SrCeO_3$ or $(VO)_2P_2O_7$.

* * * * *